US 12,266,984 B2

(12) United States Patent
Williams et al.

(10) Patent No.: US 12,266,984 B2
(45) Date of Patent: Apr. 1, 2025

(54) COMPACT MULTILAYER ACTUATOR COILS FOR CAMERA MODULES OF PORTABLE ELECTRONIC DEVICES

(71) Applicant: Apple Inc., Cupertino, CA (US)

(72) Inventors: Ross A. Williams, Cupertino, CA (US); Nicholas D. Smyth, San Jose, CA (US); Jason T. Weaver, Morgan Hill, CA (US); Hiran R. Rathnasinghe, Lemon Grove, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 17/950,927

(22) Filed: Sep. 22, 2022

(65) Prior Publication Data

US 2024/0106305 A1     Mar. 28, 2024

(51) Int. Cl.
*H02K 11/215* (2016.01)
*H02K 41/03* (2006.01)
*H04N 23/54* (2023.01)

(52) U.S. Cl.
CPC ......... *H02K 11/215* (2016.01); *H02K 41/031* (2013.01); *H04N 23/54* (2023.01)

(58) Field of Classification Search
CPC .............................. H02K 11/215; H04N 23/54
See application file for complete search history.

(56) References Cited

U.S. PATENT DOCUMENTS

| | | | |
|---|---|---|---|
| 5,761,543 A | 6/1998 | Yamada | |
| 6,477,326 B1 | 11/2002 | Partynski | |
| 6,593,558 B1 | 7/2003 | Edgar | |
| 6,788,461 B2 | 9/2004 | Kurtz et al. | |
| 7,490,779 B2 | 2/2009 | Shinozaki | |
| 7,934,836 B2 | 5/2011 | Ito | |
| 8,259,203 B2 | 9/2012 | Baldwin | |
| 8,355,042 B2 | 1/2013 | Lablans | |
| 8,553,106 B2 | 10/2013 | Scarff | |
| 8,737,830 B2 | 5/2014 | Cheng et al. | |
| 8,988,564 B2 | 3/2015 | Webster et al. | |
| 9,465,221 B2 | 10/2016 | Webster et al. | |
| 9,632,279 B2 | 4/2017 | Chen | |
| 9,686,531 B2 | 6/2017 | Ko et al. | |
| 9,968,285 B2 | 5/2018 | Valsan et al. | |

(Continued)

FOREIGN PATENT DOCUMENTS

CN     205581283 U  *  9/2016 ......... G01R 33/0005

OTHER PUBLICATIONS

U.S. Appl. No. 18/101,950, filed Jan. 26, 2023, Alaimo et al.
U.S. Appl. No. 18/205,380, filed Jun. 2, 2023, Birnbaum.
U.S. Appl. No. 17/948,054, filed Sep. 19, 2022, Rayankula et al.

*Primary Examiner* — Minh Q Phan
(74) *Attorney, Agent, or Firm* — Brownstein Hyatt Farber Schreck, LLP (57) ABSTRACT

A camera module for a portable electronic device includes an actuator assembly with at least one coil segment. The coil segment includes a dielectric substrate with two surfaces. Over each surface is formed a trace that follows a path defining a multi-turn coil. The coils of each side of the dielectric are conductively coupled together to define a single inductor/coil. The two-layer coil segment can be encapsulated as a component suitable for pick-and-place and/or SMT manufacturing. In many constructions, the actuator assembly includes a stack of coil segments, coupled together in series or parallel.

20 Claims, 9 Drawing Sheets

(56) References Cited

U.S. PATENT DOCUMENTS

| | | |
|---|---|---|
| 10,257,433 B2 | 4/2019 | Eromäki |
| 10,264,188 B2 | 4/2019 | Miller et al. |
| 10,298,913 B2 | 5/2019 | Shpunt et al. |
| 10,475,171 B2 | 11/2019 | Mrdjen et al. |
| 10,779,734 B2 | 9/2020 | Fengler et al. |
| 10,820,790 B2 | 11/2020 | Nagae |
| 11,328,150 B2 | 5/2022 | Fan |
| 11,457,133 B2 | 9/2022 | Attar |
| 11,736,784 B2 | 8/2023 | Kiniwa et al. |
| 11,754,684 B2 | 9/2023 | Garan |
| 2005/0051728 A1 | 3/2005 | Miyauchi |
| 2009/0303317 A1 | 12/2009 | Tesar |
| 2010/0033813 A1 | 2/2010 | Rogoff |
| 2010/0079587 A1 | 4/2010 | Yoshida |
| 2011/0190639 A1 | 8/2011 | Peltie et al. |
| 2013/0141541 A1 | 6/2013 | Jung et al. |
| 2013/0242057 A1 | 9/2013 | Hong et al. |
| 2014/0066781 A1 | 3/2014 | Park et al. |
| 2017/0020377 A1 | 1/2017 | Takeuchi et al. |
| 2021/0052149 A1 | 2/2021 | Fukumoto et al. |
| 2021/0168269 A1 | 6/2021 | Wheatley et al. |
| 2021/0302589 A1 | 9/2021 | Takeuchi |
| 2022/0030173 A1 | 1/2022 | Noh et al. |
| 2024/0107136 A1 | 3/2024 | Rayankula et al. |
| 2024/0107148 A1 | 3/2024 | Alaimo et al. |

\* cited by examiner

COMPACT MULTILAYER ACTUATOR COILS FOR CAMERA MODULES OF PORTABLE ELECTRONIC DEVICES

FIELD

Embodiments described herein relate to camera modules for portable electronic devices and, in particular, to coils that drive actuators in camera modules of portable electronic devices.

BACKGROUND

A portable electronic device may include a camera module for capturing an image of a scene. A conventional camera module includes an image sensor aligned with a focal plane defined by a lens group. In many cases, one or more lenses of the lens group and/or the image sensor itself may be movable to adjust focus and/or for optical image stabilization. Movable elements of a conventional camera module are typically moved by one or more electromagnetic actuators, each of which include at least one coil.

Conventional coils for camera module actuators are manufactured by winding wire around a mandrel, positioning the resulting coil on a flexible printed circuit (also referred to as a flexible circuit, flex circuit, of flex), a printed circuit board (PCB) or a mechanical structure of the camera module, mechanically bonding the coil to the flex or PCB, and electrically coupling leads of the coil to two or more contact pads defined on the flex or PCB. Such conventional processes are subject to significant positional error and increased rejection rates.

SUMMARY

Embodiments described herein take the form of an electronic device including at least a housing and a camera module disposed within the housing. The camera module includes an image sensor defining an active imaging area and a lens group defining a focal plane aligned with the active imaging area of the image sensor. The lens group includes a set of lens elements.

The camera module further includes an actuator assembly mechanically coupled to one of (1) the image sensor or (2) at least one lens element of the set of lens elements. The actuator assembly is configured to translate in one or more directions and/or to rotate along one or more axes of rotation. Specifically, the actuator assembly may be configured to physically move the image sensor and/or the at least one lens element.

The actuator assembly includes at least one coil. The coil may be positioned within a magnetic field originating from a nearby permanent magnet so as to leverage Lorenz force to effect movement as described above. The coil of the actuator assembly may be manufactured from a stack of coil segments, each of which may be separately manufactured and assembled together during assembly of the camera module using automated manufacturing techniques. The coil segments of the coil stack can be electrically and mechanically coupled in any suitable way.

In one example, an actuator assembly includes a first coil segment and a second coil segment positioned over the first coil segment. The first coil segment includes a dielectric substrate defining an upper surface and a lower surface. The first coil segment also includes a first trace following a first path on the upper surface, the path taking multiple turns. Similarly, a second trace can follow a second path on the lower surface, the path taking multiple turns. Both the first trace and the second trace may be additively manufactured. The two traces may be conductively coupled together so as to define a single inductor.

The first coil segment also includes a set of contact pads extending through an encapsulation material. A first pair of contact pads (of the set of contact pads) are conductively coupled to the first trace and the second trace and a second pair of contact pads of the set of contact pads are conductively coupled to a respective pair of contact pads of the second coil segment. In this manner, the first and second coil segments cooperate to define a single inductor for the actuator assembly.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to coil-based actuators for camera modules of portable electronic devices. More generally, embodiments described herein relate to coil-based actuators for small form-factor camera modules, whether such modules are incorporated into a portable electronic device or otherwise.

In particular, a camera module as described herein can include one or more coils to physically move one or more movable elements of the camera module. Principles of operation may vary from embodiment to embodiment, but in many cases and constructions, a coil may be used to leverage Lorenz force to physically move the coil itself (relative to a magnetic field of a permanent magnet) or another body mechanically coupled to a movable element.

In some cases, an image sensor of a camera module may be movable (e.g., translatable in plane, movable in a Z axis, tiltable, and so on). In other cases, one or more lenses of a lens group positioned over an image sensor may be movable. In some constructions, both lenses and an image sensor may be movable.

A camera module can include multiple coils for physically moving or relocating multiple movable elements of that camera module, but for simplicity of description and illustration, single coils are described and illustrated herein.

In many embodiments, a camera module takes a small form factor (e.g., less than 1 cubic centimeter of volume) so as to be incorporable into a portable electronic device. For simplicity of description, implementations in which a camera module is constructed to be incorporated into a portable electronic device are described herein, although it may be appreciated that there are merely one example, and that coils as described herein (and more broadly camera modules as described herein) can take any suitable form factor.

As noted above, as a camera module decreases in size (e.g., takes a smaller and smaller form factor) manufacturing difficulty increases. In particular, precisely placing a conventional mandrel-spun coil becomes increasingly difficult as dimensions of that coil decrease. Specifically, placing and positioning a conventional mandrel-spun coil to a precise location of a flex or PCB, mechanically coupling a conventional coil to a flex or PCB, and/or electrically coupling (e.g., soldering) a conventional coil to a flex or PCB each introduce manufacturing complexity and increase rejection rates during manufacturing. In other cases, effectiveness of traditionally-manufactured coils may be limited by coil volume; traditionally manufactured coils may not be suitable to include in particularly small form-factor camera modules.

Embodiments described herein can account for these and other precision manufacturing challenges by manufacturing coils for camera modules directly onto flex circuits and/or PCBs of those modules by additive manufacturing (e.g., physical vapor deposition, print and sinter, sputtering, atomic layer deposition, and so on). In particular, one or more turns of a coil may be additively manufactured into a flex circuit (as one example), over which a dielectric layer may be applied. Once a dielectric layer is disposed, a second set of turns may be disposed over the dielectric layer; the second layer of turns may be conductively coupled to the first layer using any suitable method (e.g., vias through the dielectric layer, around-edge coupling, and so on).

In some further embodiments, multiple turns of a coil can be additively manufactured to a desired thickness at different locations of a flex. Thereafter, the flex may be folded to as to align two or more layers of coils with one another.

In yet other embodiments, coil turns may be additively manufactured on opposite sides of a single flex. For example, a first set of turns may be manufactured onto and/or otherwise disposed onto a first side of a flex. Similarly, a second set of turns may be manufactured onto and/or otherwise disposed onto a second side of the same flex. In such cases, two or more regions of dual-sided coils may be manufactured opposite one another on the same flex, after which the flex may be folded back on itself so as to align multiple turns, thereby defining a single, multi-layer and multi-turn coil.

In some cases, a coil as described herein can be stacked atop another coil manufactured as described herein. In these cases, a first coil can be conductively and/or mechanically coupled to a flex or circuit board, after which a second coil can be disposed over the first coil, and may be conductively and/or mechanically coupled to the first coil. In some constructions, the first coil can include one or more pads on an upper surface thereof to facilitate electrical/conductive connection to the second coil. In such constructions, the first and second coils may be constructed so as to be electrically connected in series or parallel; circuit topologies may vary from embodiment to embodiment.

In some cases, coils of differing diameter, dimension, or aspect ratio may be grouped together to define a single coil. For example, a first additively manufactured coil having a first aspect ratio may be positioned below a pair of additively manufactured coils having a second aspect ratio less than the first aspect ratio (e.g., half of the first aspect ratio). In this construction, three coils can be conductively coupled in a number of suitable circuits, as may be known to a person of skill in the art. For example, two of the three coils may be connected in series, which in turn is coupled in parallel with the final coil.

In other cases, layers of stacked additively-manufactured coils can be selectively activated to impart different magnetic field strengths. For example, in some constructions, different coils may be addressable and individually controllable.

In many embodiments, additively manufactured coils such as described herein can occupy a smaller volume than traditionally manufactured coils. Such coils may be smaller in one dimension, or multiple dimensions while maintaining equivalent, or higher, current-carrying capacity as compared to traditionally-manufactured coils.

These foregoing and other embodiments are discussed below with reference to FIGS. 1A-7. However, those skilled in the art will readily appreciate that the detailed description given herein with respect to these figures is for explanation only and should not be construed as limiting.

Figure 1A:
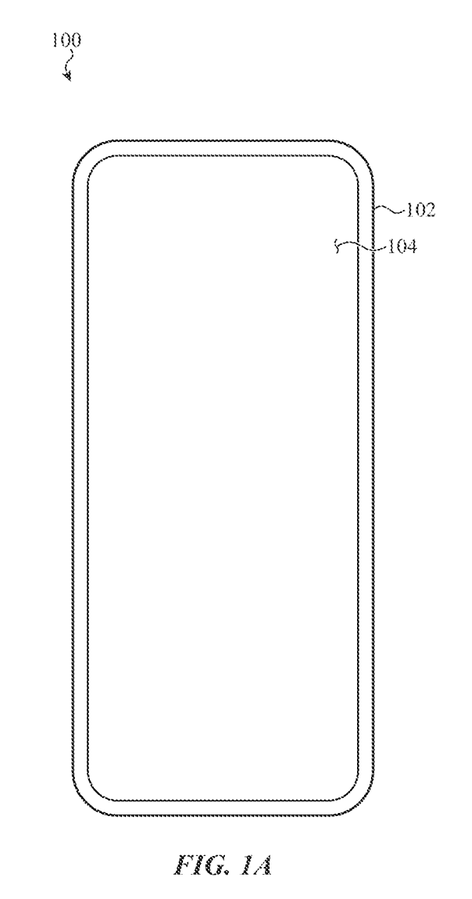
FIG. 1A depicts an example electronic device that can include a camera system and/or camera module, such as described herein.

FIG. 1A depicts an example electronic device that can include a camera system and/or camera module, such as described herein. The electronic device 100 may be a portable electronic device, such as a cellular phone, wearable device, or tablet computing device. It may be appreciated, however, that a portable electronic device is merely one example device that can include a camera system and/or camera module as described herein.

The electronic device 100 as depicted in FIG. 1A is defined at least in part by a low-profile housing, identified in the figure as the housing 102. The housing 102 can enclose and support one or more components of the electronic device 100, such as a processor, one or more memory components or circuits, a battery, and a display 104.

For simplicity of description and illustration, FIG. 1A is depicted without many of these components; a person of skill in the art may readily appreciate that a number of components, circuits, structures, and systems can be included in the housing 102 of the electronic device 100. For example, the electronic device 100 can include a processor configured to access a memory to instantiate a software application configured to render a graphical user interface via the display 104.

Figure 1B:
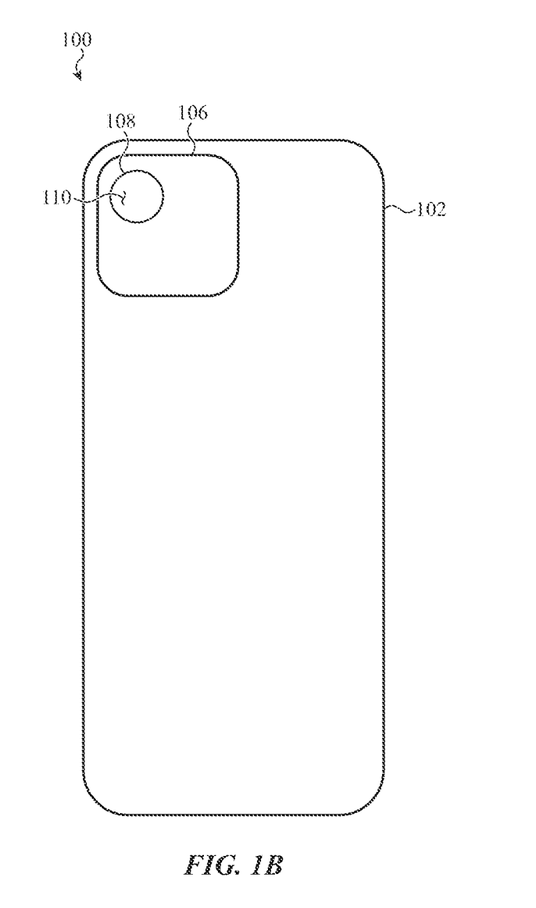
FIG. 1B depicts the example electronic device of FIG. 1A, showing a camera module, such as described herein.

The software application can, in some examples, be configured to integrate with one or more hardware sensors or sensing systems of the electronic device 100, such as a camera module. FIG. 1B depicts the example electronic device of FIG. 1A, showing a camera module 106. The camera module 106 can include a camera module 108 that includes a set of camera modules 110.

In particular, the camera module 106 can include an image sensor disposed at an image plane defined by a lens group of the set of camera modules 110. The lens group(s) may define a fixed or variable focal length for each respective image sensor. For simplicity of description, a single image sensor and lens group are described with reference to the embodiments that follow; it is appreciated that in many cases, the set of camera modules 110 can include multiple lens groups, multiple image sensor, and so on.

As noted above, a lens group and/or an image sensor may be movable relative to the camera module 106 and/or relative to the housing 102 of the electronic device 100. In many cases, the movable element(s) can include an image sensor and/or one or more lenses of a lens group. For example, an image sensor can be operably coupled to an actuator structure configured to translate the image sensor by a distance in a direction in plane with an active imaging area of the image sensor. In other cases, the actuator structure can be configured to translate the image sensor, in plane, by a first distance in a first direction (e.g., along an X axis), and by a second distance in a second direction (e.g., along a Y axis). In yet other examples, the actuator structure can be configured to translate the image sensor in three directions, for example, X Y and Z axes (e.g., translating out of X-Y plane).

In other cases, the actuator structure can be configured to pivot about one or more fulcrums so as to change one or more angles describing a relative position between a normal vector of the imaging plane (e.g., in plane with an active display area of the image sensor) and a central axis of one or more lenses above the image sensor. For example, the image sensor may be configured, by the actuator structure, to tilt or otherwise rotate relative to a central axis of a lens group.

As may be appreciated by a person of skill in the art, a movable image sensor may be useful for optical image stabilization purposes. In other cases, movement of an image sensor may be intentionally induced so as to impart a unique imaging effect, such as tilt-shift photographic techniques.

In other cases, one or more lenses may be additionally or alternatively movable by a separate actuator structure to the actuator structure described above. A movable lens may be configurable to pivot, translate in plane, translate out of plane, rotate, and so on.

An actuator structure as described herein typically includes at least one coil that leverages Lorenz force to physically move itself relative to a permanent magnet or, in some constructions, to move a magnet relative to itself. In other cases, leveraging the Lorenz force may not be required of a particular design or implementation; a coil may be used as a solenoid to attract or repel a ferromagnetic or diamagnetic material. In many cases, an actuator structure can include multiple coils. For example, three coils may be used to control three degrees of freedom of a movable image sensor.

An actuator structure, as referenced herein, can be operably and/or conductively coupled to an actuator controller which may be implemented as an application specific integrated circuit within a camera module, such as the camera module 106. In some embodiments, the actuator controller may be operably coupled to an instance of firmware instantiated by cooperation of a processor and memory of the camera module 106. The actuator controller may receive instructions and/or signals from the instance of firmware and/or from the processor directly, to apply a voltage or current to one or more coils in order to change a physical position of a movable element of the camera module 106 (such as a lens or the image sensor). For example, in some cases, a particular magnitude of current may be circulated through a specified coil that is, itself, within a magnetic field originating from a permanent magnet nearby in order to induce a Lorenz force of known magnitude to cause the coil (and elements physically coupled to the coil) to move in a particular direction. More simply, the actuator controller may receive one or more instructions to move a movable element in a particular direction for a particular distance and/or to a particular angle.

In some cases, the actuator controller can receive a voltage signal or current signal having a magnitude, pulse width, phase, and/or frequency that correlates to a desired output direction, magnitude and/or direction of movement. In other cases, the actuator controller can be configured to receive a digital value corresponding to the same.

In some cases, the actuator controller can be coupled to and/or may include a memory storing a lookup table that correlates particular movements of a movable elements to particular currents or voltages applied to particular coils of a particular, given, camera module—such as the camera module 106. Many constructions are possible.

In some cases, the actuator controller can be configured to receive as input an output provided by an accelerometer or gyroscope. This output can be inverted, scaled, and converted to a movement instruction executed by the actuator controller to cause an associated actuator structure to move a movable element, such as an imaging sensor or lens element.

In further embodiments, an actuator controller as described herein may be communicably and/or operably coupled to one or more instances of software executing over a processor disposed within the housing 102 of the electronic device 100. For example, in some embodiments, a software application instance instantiated over a processor and/or memory of the electronic device 100 can leverage the display 104 to generate a user interface with which a user of the electronic device 100 can interact. In some examples, the software application may be an imaging application, such as a camera control application.

The camera control application can present one or more user interface elements via the display 104 which may be selected by a user. In some cases, one of the user interface elements can be used by a user of the electronic device 100 to control a relative position of a movable element, such as to control a focal point, a focal length, an alignment between the image sensor and a central axis defined by a lens group, and so on.

In other words, in some cases, the user interface may receive a signal or other input from a user comprising an instruction to cause an actuator controller to select and/or apply an appropriate signal as input to an actuator structure, and in particular, to a coil of an actuator structure to cause the coil to generate a magnetic field of particular orientation and magnitude.

These foregoing embodiments depicted in FIGS. 1A-1B and the various alternatives thereof and variations thereto are presented, generally, for purposes of explanation, and to facilitate an understanding of various configurations and constructions of a portable electronic device that can incorporate a camera module with additively manufactured coils, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
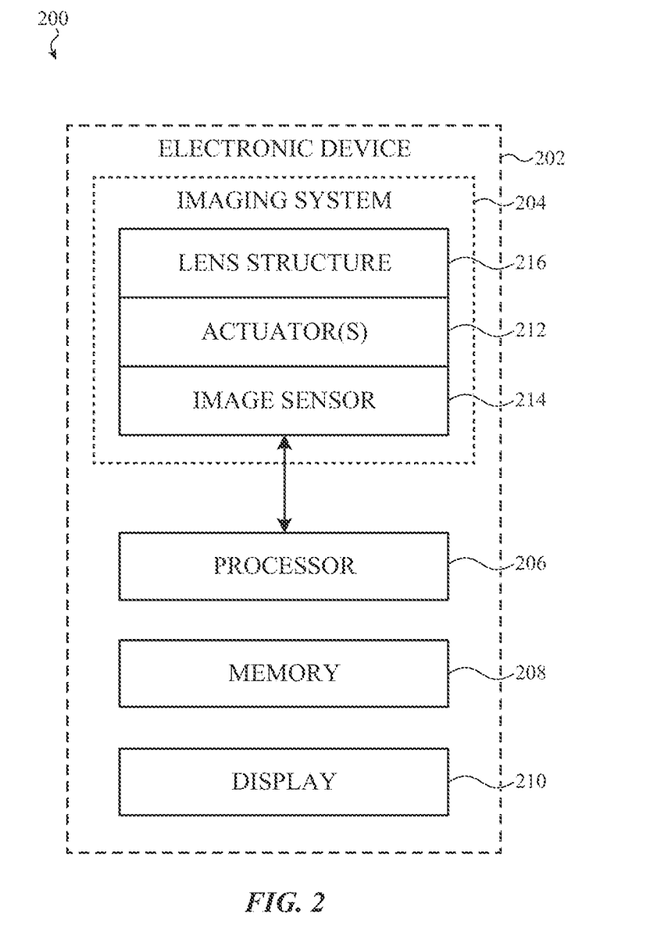
FIG. 2 is a simplified system diagram of an electronic device as described herein.

For example, more generally and broadly, it may be appreciated that any suitable electronic device can include a camera module as described herein. FIG. 2 is a simplified system diagram of such an example electronic device that can include a camera module with at least one actuator, as described herein.

For example, an electronic device that can include a camera system and/or camera module as described herein can be implemented as an example electronic device, identified in FIG. 2 as the electronic device 200.

The electronic device 200 can include a processor 202, a memory 204, and (optionally) a display 206. As noted with respect to other embodiments described herein, the processor 202 can be configured to access the memory 204 to retrieve one or more computer-executable instructions and/or other executable assets in order to instantiate one or more instances of software that, in turn, may perform or coordinate one or more operations performed by the processor 202.

For example, in some embodiments, the electronic device 200 can leverage the processor 202 and the memory 204 to instantiate an instance of a photography software application. The photography software application instance can be configured to access and/or communicably couple to a camera module 208 of the electronic device 200.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data processing device or circuit physically and/or structurally configured to define a temporary or durable (e.g., volatile or nonvolatile) storage media configured to store one or more data structures or files and so on, regardless of media type (e.g., optical, magnetic, electric, photonic, and so on).

The camera module 208 can include a lens structure 210, an actuator structure 212, and an image sensor 214. The lens structure 210 can be configured to receive and focus light from a scene external to the electronic device 200 that may be imaged by the image sensor 214. The lens structure 210 can include any suitable number of optical elements configured to modify a phase or direction of light passing through. The lens structure 210 can include one or more movable or fixed concave or convex lenses; the configuration and/or position of the lenses of the lens structure 210 can vary from embodiment to embodiment and may be controlled at least in part by the actuator structure 212.

In some cases, the lens structure 210 can also include one or more filters configured to exhibit selected reflectance and/or transmittance for particular bands of light. For example, the lens structure 210 can include an infrared cut filter configured to reflect infrared light away from the image sensor 214. In other cases, an infrared cut filter may be configured to absorb infrared light. In yet other cases, the lens structure 210 can include one or more color filters configured to reflect particular colors of light. In yet other cases, the lens structure 210 can include one or more reflective surfaces, such as mirrors or beam splitters configured to redirect a path of light as it passes through the lens structure 210. For example, in some constructions the camera module 208 can be implemented with a periscopic lens structure.

These forgoing examples are not exhaustive of the types or arrangements of optical elements that can be leveraged by a camera module, such as described herein. In particular, it may be appreciated by a person of skill in the art that the lens structure 210 can include any number of suitable optical elements, arranged in any suitable order, for any particular embodiment. Further, as noted above, in some cases, the actuator structure 212 can be configured to move the image sensor 214 itself.

These foregoing embodiments depicted in FIGS. 1A-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
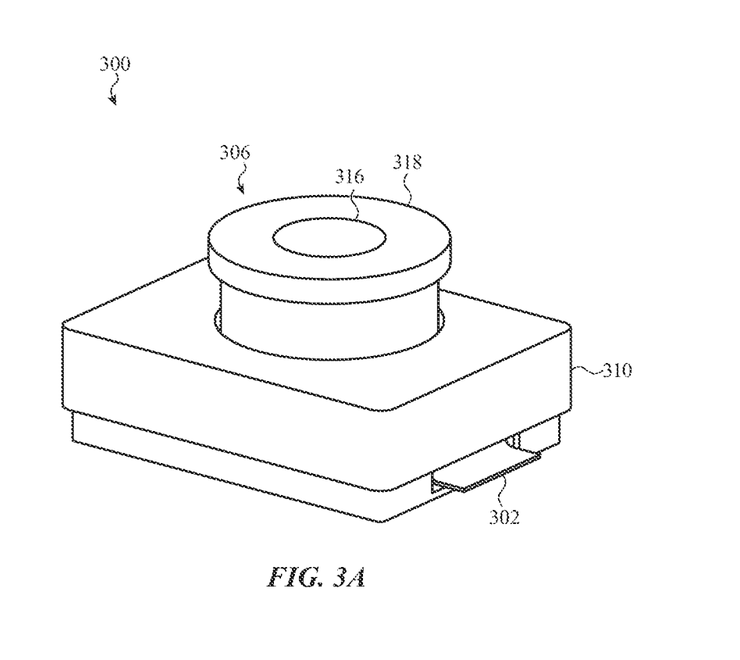
FIG. 3A shows a perspective view of an example camera with a moveable image sensor and a flex circuit.

A camera module as described herein can be implemented in a number of suitable ways, and may take a number of suitable form factors. In many examples, as noted above, a camera module can take a small form factor suitable for inclusion within a housing of a low-profile electronic device such as a cellular phone. FIG. 3A depicts such a configuration, although it may be appreciate that this is merely one example construction.

The camera module 300 can include one or more lens elements or groups that cooperate to define a focal plane aligned with an active imaging area of an image sensor. As with other embodiments described herein, one or more elements of the camera module 300 can be movable.

To facilitate movement of one or more elements of the camera module (e.g., lenses, image sensor, and so on), flexible circuit boards may be used to accommodate and support functional electronics associated with the camera module 300.

In general, the flex circuit may include a plurality of planar segments that are connected via one or more bends. The flex circuit may be fixed relative to the image sensor, and may be positioned within the camera such that movement of the image sensor (or other movable elements) along a first direction causes twisting in one or more of the plurality of segments. This twisting may allow the flex circuit to accommodate the movement of the image sensor along the first direction while itself having a negligible impact on the overall volume of the camera module 300, and specifically, overall volume of a module enclosure of the camera module 300. In certain constructions, the twisting or other deflection of the flex circuit can provide a return force to return the image sensor and/or other movable element to a nominal position.

Figure 3B:
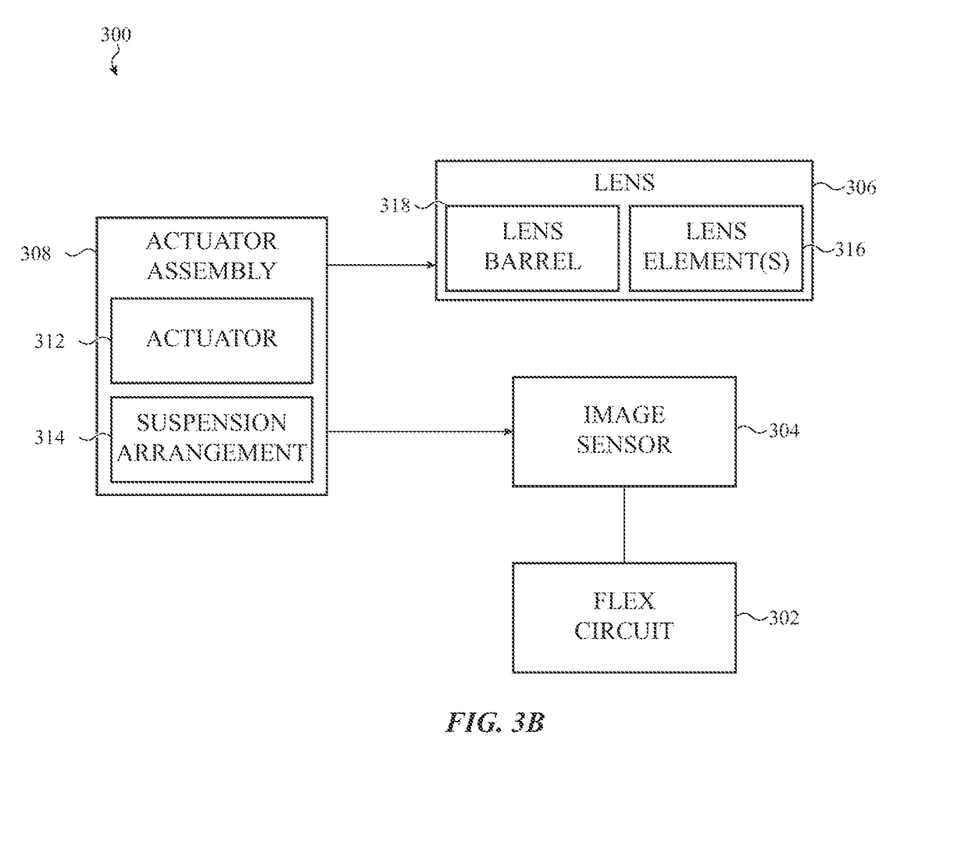
FIG. 3B shows a schematic block diagram of example components of the camera of FIG. 1A.

FIGS. 3A and 3B show a perspective view and a schematic block diagram of a camera module 300 supported at least in part by a flex circuit 302. With reference to both FIGS. 3A and 3B, the camera module 300 may include the flex circuit 302, an image sensor 304, lens 306, an actuator assembly 308, and a module enclosure 310.

The module enclosure 310 may be configured to at least partially enclose the various components of camera module 300, and in some variations may act to shield internal camera components from interference as well as to shield other components or devices external to the housing from electromagnetic interference originating within the camera module 300.

The lens 306 includes one or more lens elements 316 configured to direct light received by the camera toward the image sensor 304. The lens 306 may further comprise a lens barrel 318 that houses some or all of the lens elements 316. In some instances, the camera module 300 may be configured to have a folded optics arrangement, where the camera module 300 further includes one or more mirrors or prisms to redirect the light captured by the camera. It should be appreciated that in a folded optics arrangement, the optical axis of the lens 306 and camera module 300 may extend along multiple directions (e.g., a light folding element such as a prism or mirror may change the direction of the optical axis).

For simplicity, the "optical axis" of a camera module is a portion of an optical axis of a lens, as light exits the lens and propagates toward an image sensor. The optical axis of an image sensor is considered to be a vector normal to a plane of an active image area of the image sensor; the normal vector is typically parallel to the optical axis.

The image sensor 304 may receive light through the lens 306, and may generate one or more signals that may convey information about the light received during imaging (which are conveyed off the image sensor 304 via the flex circuit 302). The image sensor may be any suitable sensor, such as a CCD, CMOS sensor, or the like. In some cases, the lens 306, or a portion thereof, may be configured to move within the camera, by operation of the actuator assembly 308.

As mentioned above, the image sensor 304 (and/or portions of the lens 306) may be configured to move within the camera (e.g., relative to at least the module enclosure 310). For example, the image sensor 304 may be moved relative to the lens 306 along the optical axis of the camera module 300 to adjust the camera's focus, which may allow the camera module 300 to provide autofocus. Additionally or alternatively, the image sensor 304 may be moved relative to the lens in one or more directions perpendicular to the optical axis of the camera module 300, which may allow the camera module 300 to provide optical image stabilization capabilities.

It should be appreciated that the cameras described may be configured to perform both autofocus and optical image stabilization, or it may be configured to perform only one of these operations. Furthermore, in some instances, the camera module 300 may be further configured to adjust the position or optical power of the lens 306 to assist with autofocus and/or optical image stabilization operations. This may be achieved by moving one or more lens elements of the lens 306 relative to the image sensor 304. Additionally or alternatively, the lens 306 may comprise a variable focus lens element (e.g., a liquid lens), which may be actuated to adjust the optical power and/or optical axis of the lens element.

Autofocus and optical image stabilization operations may be performed by any suitable combination of positional adjustments of the image sensor 304 and/or the lens 306. With reference to FIG. 1B, the camera module 300 may further comprise an actuator assembly 308 configured to move the image sensor within the camera module 300.

The actuator assembly 308 includes an actuator 312 and a suspension arrangement 314. The actuator 312 is configured to generate the forces to needed to move the image sensor, and may comprise a voice coil motor, a comb drive, or the like. In other cases, other mechanical couplings may be used for an actuator assembly such as described herein; suspension is not required of all embodiments. In some cases, as one example, bearings may be used.

In embodiments where the actuator 312 includes a voice coil motor, the voice coil motor may comprise a magnet and a coil, one of which may be fixed relative to the image sensor 304 (either via a direct connection to the image sensor, or via indirect connection via one or more intervening components or support structures) and the other of which may be fixed within the camera in a manner that allows the image sensor 304 to move relative thereto.

The coil may be positioned within the magnetic field of the magnet such that when current is driven through the coil, a Lorentz force induces a change in relative position of the coil and magnet, which in turn may displace, tilt, translate, or rotate the image sensor within the camera module 300.

It should be appreciated that some embodiments may include an actuator 312 with a plurality of voice coil motors, each of which may be used to generate Lorentz forces as discussed above. The suspension arrangement 314 may be configured to suspend the image sensor 304 (as well as one or more other components connected thereto) within the camera module 300, and may allow the image sensor 304 to move within camera module 300 along one or more directions, angles, and/or within one or more planes or axes of rotation.

The suspension arrangement 314 may comprise one or more suspension elements, such as flexures (e.g., leaf springs, suspension wires, flexure arms, and so on) and/or one or more bearings, and so on. In instances where the suspension arrangement 314 includes one or more flexures, the flexures may provide a moveable connection between the image sensor (for example, via a holding structure that carries the image sensor) and one or more additional structures in the camera.

In instances in which the suspension arrangement 314 includes one or more bearings, the bearings may be positioned between the moving image sensor 304 (e.g., via a holding structure that carries the image sensor) and one or more additional structures in the camera, and may guide image sensor movement.

These foregoing embodiments depicted in FIGS. 3A-3B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

In many embodiments, as noted above, an actuator that includes a voice coil or more generally any coil may be difficult to reliably manufactured in particular configurations. As such, for embodiments described herein a voice coil or more generally a "coil" may be additively manufactured onto a flex or PCB in order that the position of the coil relative to other components may be precisely controlled.

Figure 4A:
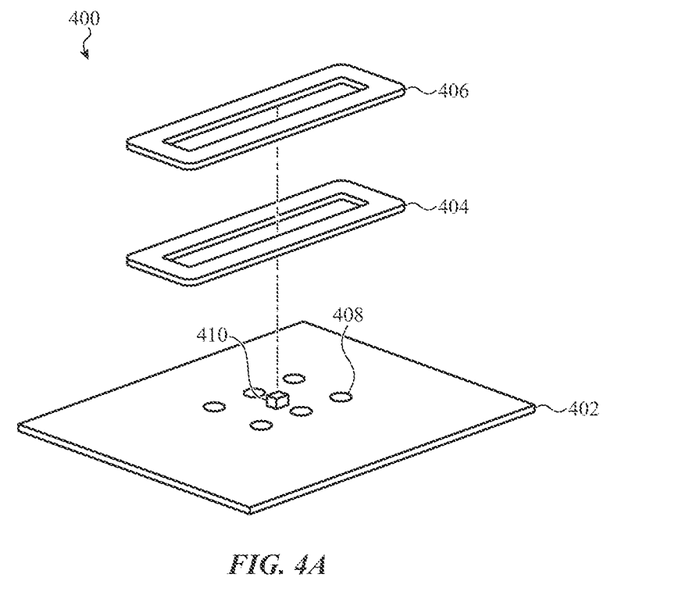
FIG. 4A depicts a simplified exploded view of an additively-manufactured coil stack, as described herein.
Figure 4B:
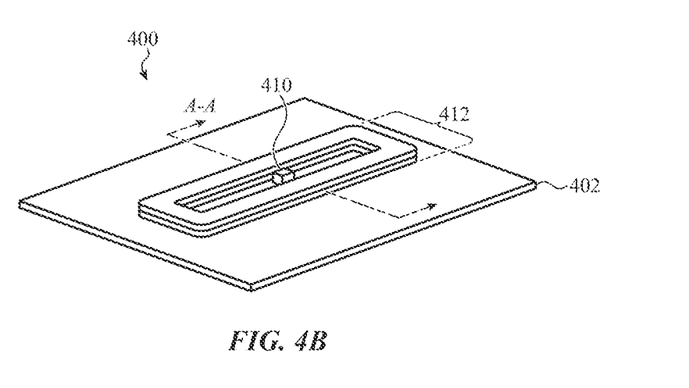
FIG. 4B depicts an assembled coil stack, as described herein.

FIG. 4A depicts a simplified exploded view of an additively-manufactured coil stack, as described herein. FIG. 4B depicts the coil stack (also referred to as a coil assembly) of FIG. 4A in unexploded view. As depicted, the coil assembly 400 can include multiple layers of material, some or all of which may be additively manufactured.

The coil assembly 400 is additively manufactured over a substrate 402 that may be a flexible circuit and/or a rigid circuit board such as a PCB. Over the substrate 402 can be disposed a first set of turns of conductive material which defines a first coil segment 404.

In some embodiments, the first coil segment 404 can be independently additively manufactured on a respective dedicated flex circuit, after which the first coil segment 404 can be placed onto the substrate 402.

In other embodiments, the first coil segment 404 is formed onto the substrate 402. Over the first coil segment 404 may be formed a second coil segment 406. As with the first coil segment 404, the second coil segment 406 can be defined by a set of turns of conductive material. In another phrasing, both the first coil segment 404 and the second coil segment 406 can be defined by traces of conductive material that form one or more closed loops. For example, in many embodiments, at least one of the first coil segment 404 or the second coil segment 406 may be defined by a spiral trace disposed onto the substrate 402; each subsequent turn of the spiral trace may have a different diameter or radius than the turn before.

In many cases, the first coil segment 404 may have disposed thereon a dielectric material prior to the second coil segment 406 being disposed or formed. In some cases, the first coil segment 404 may be encapsulated partially or entirely in a dielectric material before the second coil segment 406 is disposed.

The first coil segment 404 can be disposed over one or more contact pads 408 that electrically couple the first coil segment 404 and/or the second coil segment 406 to one or more circuits within an associated camera module housing. In other cases, the contact pads 408 can be conductively coupled, via one or more traces disposed on, in, or below the substrate 402 to circuitry external to the camera module, such as a processor of an electronic device incorporating the camera module that, in turn, incorporates the coil assembly 400.

In many constructions, the coil assembly 400 can further include a magnetic position sensor 410, which may be a Hall effect sensor or a magnetoresistive sensor, used to detect a position relative to a permanent magnet nearby the coil assembly. The magnetic position sensor 410 may be positioned within the inner regions of the respective first and second coil segments 404, 406; more precisely, the magnetic position sensor 410 may be positioned within the coil assembly 412 which itself is defined by each of the first and second coil segments 404, 406.

The magnetic position sensor 410 can be disposed into the substrate 402 before or after the coil segments are formed or disposed thereon. In some cases, an internal region of either or both the first coil segment 404 or the second coil segment 406 may be filled with a dielectric material, such as a dielectric potting or an epoxy material. In these cases, the magnetic position sensor 410 may be disposed above or on an infilled region of the first coil segment 404 (thereby elevating the magnetic position sensor 410 above the substrate 402. In other cases, the magnetic position sensor 410 may be disposed onto the substrate 402, surrounded by the first coil segment 404, and enclosed within a volume defined between the first coil segment 404 and an infilled embodiment of the second coil segment 406. In such examples, the magnetic position sensor 410 may be effectively protected and/or encapsulated by the infilled second coil segment.

In other cases, the magnetic position sensor 410 can be disposed on an infilled center region of the first coil segment 404, elevating the magnetic position sensor 410 relative to the substrate 402. Such constructions may exhibit greater magnetic field sensitivity as compared to substrate-mounted embodiments.

In some embodiments, electrical couplings for one or more signal lines dedicated to the magnetic position sensor 410 may pass through the first coil segment 404, the second coil segment 406, and/or portions of the substrate 402. In some embodiments, the first coil segment 404 can include on an upper surface thereof one or more pads suitable for conductively coupling to the second coil segment 406 and/or to the magnetic position sensor 410. In certain cases, the magnetic position sensor 410 may be conductively coupled in circuit with one or more of the coil segments, but in many embodiments, the magnetic position sensor 410 and its respective traces form a portion of a circuit separate from the coil segments.

The first and second coil segments can be manufactured in a number of suitable ways including by physical vapor deposition, sputtering, print and sinter, and so on. In many cases, the individual coil segments may be manufactured and encapsulated separate from the substrate 402 and may be attached to the substrate 402 in one or more pick-and-place and/or SMT mounting processes.

Figure 5A:
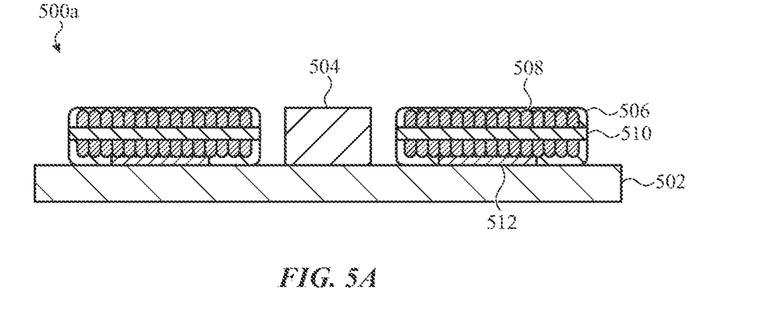
FIG. 5A depicts a cross-section view taken through line A-A of FIG. 4B depicting a single layer of an additively manufactured coil stack, as described herein.

FIG. 5A depicts a cross-section view taken through line A-A of FIG. 4B depicting a single layer of an additively manufactured coil stack, as described herein. In this cross-section, the coil assembly 500a includes a substrate 502 to which a magnetic position sensor 504 may be coupled using a suitable SMT technique. Thereafter, a coil segment 506 may be coupled to the substrate 502 enclosing the magnetic position sensor 504. The coil segment 506 can be defined by a dielectric substrate including an upper surface and a lower surface. Specifically, on the upper surface may be formed/disposed a first set of turns 508 and on a lower surface of the dielectric substrate 510 may be disposed a second set of turns. In many embodiments and constructions the first and second sets of turns may be additively manufactured onto the surfaces of the dielectric substrate 510. The coil segment 506 can thereafter be encapsulated or otherwise sealed as a single component within an encapsulation material. The coil segment 506 can expose through the encapsulation at least two contact pads, such as the contact pad 512, which in turn may be used to conductively couple to one or more traces defined in, on, or through the substrate 502.

Figure 5B:
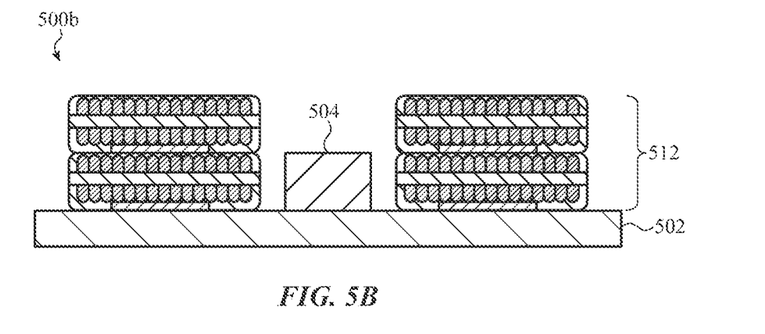
FIG. 5B depicts a cross-section view taken through line A-A of FIG. 4B depicting a dual layer of an additively manufactured coil stack, as described herein.
Figure 5C:
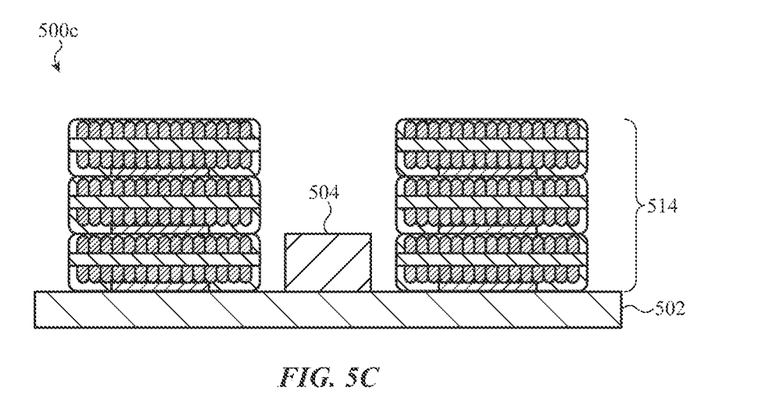
FIG. 5C depicts a cross-section view taken through line A-A of FIG. 4B depicting a multi-layer of an additively manufactured coil stack, as described herein.

A person of skill in the art may appreciate that the additively manufactured coil segment of FIG. 5A can be more efficiently and precisely handled during automated manufacturing. In addition, the additively manufactured coil of FIG. 5A can be stacked with other similarly-manufactured coil segments to define larger (e.g., more powerful) coils, such as shown in FIG. 5B. In this figure, the coil assembly 500b includes two additively manufactured coil segments are coupled together (electrically in series or in parallel; embodiments will differ) to define a coil stack 514. The second coil segment can be conductively coupled to the first coil segment such that the coil stack 514 defines a single coil.

Figure 6:
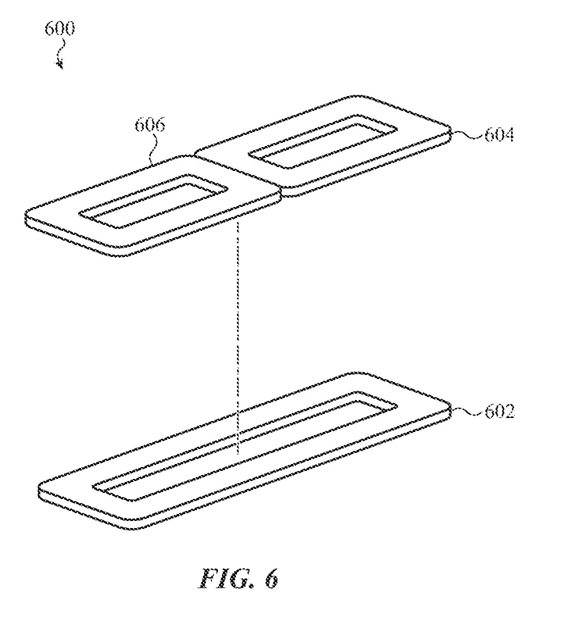
FIG. 6 depicts a simplified exploded view of an additively-manufactured coil stack, as described herein.

In yet other examples, differently-sized additively manufactured coil segments can be disposed over one another so as to define a single, more powerful, small-size simple to handle during automated manufacturing coil, such as shown in FIG. 6. In this embodiment, a coil assembly 600 includes a first coil segment 602 which is conductively and mechanically coupled to a second and third coil segments 604, 606 so as to define a single circuit. More specifically, leads of the second and third coil segments can be conductively and/or mechanically coupled to pads defined on an upper surface of the first coil segment 602.

Figure 7:
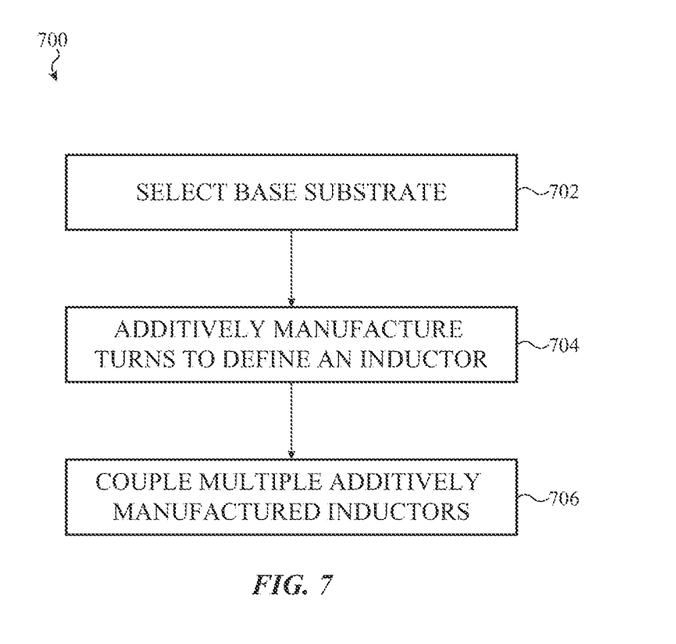
FIG. 7 is a flowchart depicting example operations of another method of manufacturing a coil segment for a camera module, such as described herein.

FIG. 7 is a flowchart depicting example operations of another method of manufacturing a coil segment (such as the coil segment 506 of FIG. 5A) for a camera module, such as described herein. The method 700 includes operation 702 at which a dielectric substrate may be selected. Next, at 704, one or more traces or turns can be additively manufactured onto an upper and lower surface of the dielectric substrate, opposite one another. In many cases, a set of turns disposed/formed onto an upper surface may be mirrored in relation to a second set of turns disposed/formed onto the lower surface of the substrate; mirroring of the two sets of turns may be defined across a central dividing line through the substrate, between the upper surface and the lower surface. Finally at operation 706, after optionally encapsulating the additively manufactured coils on opposite sides of a substrate, multiple similarly manufactured components can be coupled together to define a single coil stack.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of some embodiments, whether or not such embodiments are described and whether or not such features are presented as being a part of a described embodiment. Thus, the breadth and scope of the present description should not be limited by any of the above-described exemplary embodiments but is instead defined by the claims herein presented.

What is claimed is:

1. An electronic device comprising:
    a housing; and
    a camera module disposed within the housing, the camera module comprising:
        an image sensor defining an active imaging area;
        a lens group defining a focal plane aligned with the active imaging area of the image sensor, the lens group comprising a set of lens elements; and
        an actuator assembly mechanically coupled to one of the image sensor or at least one lens element of the set of lens elements, the actuator assembly comprising a first coil segment and a second coil segment positioned over the first coil segment, the first coil segment comprising:
            a dielectric substrate defining:
                an upper surface; and
                a lower surface;
            a first trace following a first path comprising multiple turns, the first trace formed onto the upper surface of the dielectric substrate;
            a second trace following a second path comprising multiple turns, the second trace formed onto the lower surface of the dielectric substrate, the second trace conductively coupled to the first trace;
            an encapsulation material encapsulating the first trace and the second trace and at least a portion of the dielectric substrate; and
            a set of contact pads extending through the encapsulation material, wherein a first pair of contact pads of the set of contact pads are conductively coupled to the first trace and the second trace and a second pair of contact pads of the set of contact pads are conductively coupled to a respective pair of contact pads of the second coil segment.

2. The electronic device of claim 1, wherein the actuator assembly comprises:
    a permanent magnet positioned such that a magnetic field originating from the permanent magnet passes through the first coil segment and the second coil segment.

3. The electronic device of claim 2, further compromising a magnetic position sensor disposed within the actuator assembly.

4. The electronic device of claim 3, wherein the magnetic position sensor is disposed over the encapsulation material of the first coil segment.

5. The electronic device of claim 3, wherein the magnetic position sensor is disposed on a flexible circuit board that couples to the first coil segment.

6. The electronic device of claim 1, wherein the first trace mirrors the second trace.

7. The electronic device of claim 1, wherein a construction of the second coil segment matches the first coil segment.

8. A portable electronic device comprising:
a camera module comprising:
an image sensor;
an actuator assembly mechanically coupled to the image sensor and comprising a set of coil segments positioned in a stack, each coil segment of the set of coil segments comprising:
a dielectric substrate defining:
an upper surface; and
a lower surface;
a first trace following a first path comprising multiple turns, the first trace disposed onto the upper surface of the dielectric substrate;
a second trace following a second path comprising multiple turns, the second trace disposed onto the lower surface of the dielectric substrate, the second trace conductively coupled to the first trace;
an encapsulation material encapsulating the first trace and the second trace and at least a portion of the dielectric substrate; and
a set of contact pads extending through the encapsulation material, wherein a first pair of contact pads of the set of contact pads are conductively coupled to the first trace and the second trace and a second pair of contact pads of the set of contact pads are conductively coupled to a respective set of contact pads of a different coil segment.

9. The portable electronic device of claim 8, wherein the stack defines a single electromagnetic coil.

10. The portable electronic device of claim 9, wherein the actuator assembly comprises an actuator controller configured to apply an electronic signal to the single electromagnetic coil to generate a magnetic field.

11. The portable electronic device of claim 10, wherein the actuator assembly comprises a permanent magnet positioned such that a field originating from the permanent magnet passes through the single electromagnetic coil.

12. The portable electronic device of claim 11, wherein, in response to the electronic signal, a Lorenz force is induced to move the image sensor in at least one direction.

13. The portable electronic device of claim 12, wherein a distance moved by the image sensor corresponds to a property of the electronic signal.

14. The portable electronic device of claim 8, wherein a respective dielectric substrate of at least one coil segment of the stack is a flexible substrate comprising a fold.

15. A camera module for a portable electronic device, the camera module comprising:
a movable element selected from a group consisting of an image sensor and a lens; and
an actuator assembly mechanically coupled to the movable element and comprising a stack of coil segments conductively coupled to one another to define a single electromagnetic coil, each coil segment respectively comprising:
a dielectric substrate defining an upper surface and a lower surface;
a first set of turns additively manufactured onto the upper surface of the dielectric substrate;
a second set of turns additively manufactured onto the lower surface of the dielectric substrate, the second set of turns conductively coupled to the first set of turns;
an encapsulation material encapsulating the first and second sets of turns; and
a set of contact pads extending through the encapsulation material, wherein a first pair of contact pads of the set of contact pads are conductively coupled to a respective first set of turns and a respective second set of turns and conductively coupled to a respective set of contact pads of a different coil segment.

16. The camera module of claim 15, wherein each respective first set of turns is disposed into each respective upper surface of each respective dielectric substrate by one of sputtering or physical vapor deposition.

17. The camera module of claim 15, wherein the stack comprises at least three coil segments.

18. The camera module of claim 15, wherein each respective first set of turns is conductively coupled to each respective second set of turns by a respective via extending through each respective dielectric substrate.

19. The camera module of claim 15, wherein the actuator assembly comprises a magnetic position sensor.

20. The camera module of claim 19, wherein the magnetic position sensor is disposed within a central region of at least one coil segment.

* * * * *